United States Patent [19] [11] Patent Number: 4,691,260
Hosaka et al. [45] Date of Patent: Sep. 1, 1987

[54] TUNNEL ERASE MAGNETIC HEAD ASSEMBLY

[75] Inventors: Shuroku Hosaka, Kamakura; Masaaki Shiga, Fujisawa, both of Japan

[73] Assignee: Mitsubishi Denki Kabushiki Kaisha, Tokyo, Japan

[21] Appl. No.: 631,318

[22] Filed: Jul. 16, 1984

[30] Foreign Application Priority Data

Sep. 16, 1983 [JP] Japan .................................. 58-170838

[51] Int. Cl.$^4$ ........................ G11B 5/265; G11B 5/024
[52] U.S. Cl. ........................................ 360/121; 360/118
[58] Field of Search ............... 360/118, 119, 121, 122, 360/123, 103, 120

[56] References Cited

U.S. PATENT DOCUMENTS

| 3,882,544 | 5/1975 | Hughes | 360/118 |
| 4,058,846 | 11/1977 | Knutson et al. | 360/121 |
| 4,176,384 | 11/1979 | Yang | 360/121 |
| 4,276,574 | 6/1981 | Baasch et al. | 360/121 |
| 4,318,146 | 3/1982 | Ike et al. | 360/119 X |
| 4,367,505 | 1/1983 | Stromsta et al. | 360/121 |
| 4,506,308 | 3/1985 | Furuichi et al. | 360/121 |
| 4,613,920 | 9/1986 | Higuchi et al. | 360/121 |

FOREIGN PATENT DOCUMENTS

| 0012842 | 7/1980 | European Pat. Off. | 360/103 |
| 0110513 | 6/1984 | European Pat. Off. | 360/103 |
| 2446879 | 4/1975 | Fed. Rep. of Germany | 360/118 |
| 3217267 | 11/1982 | Fed. Rep. of Germany | 360/121 |
| 56-54624 | 5/1981 | Japan | 360/121 |
| 58-125224 | 7/1983 | Japan | 360/121 |

Primary Examiner—Stuart N. Hecker
Assistant Examiner—Benjamin E. Urcia
Attorney, Agent, or Firm—Oblon, Fisher, Spivak, McClelland & Maier

[57] ABSTRACT

A magnetic head assembly comprises a recording-reproducing head and erasing heads placed at both sides of said recording-reproducing head and the magnetic field strength of the erasing gap of one of the erasing heads which move adjacent data produced by a recording-reproducing gap is made different from that of the erasing gap of the other erasing gap to control a data area to be erased.

6 Claims, 13 Drawing Figures

TUNNEL ERASE MAGNETIC HEAD ASSEMBLY

The present invention relates to a magnetic head assembly used for a magnetic disc device for recording and reproducing data.

In recent years, demands for magnetic disc devices have been increasing and such devices have been utilized in various fields.

FIG. 1 is a perspective view of a magnetic head assembly used for a conventional flexible disc device. A magnetic circuit is formed by a recording-reproducing core 1 having a recording-reproducing gap, a recording-reproducing coil 3 wound around a leg portion of the recording-reproducing core 1 and a closing core 4. Erasing cores 5a, 5b are arranged at both sides of the recording-reproducing core 1 and are respectively provided with erasing gaps 6a, 6b. An erasing coil 7 is wound around the erasing cores 5a, 5b putting them together. A recording-reproducing core spacer 8 and erasing core spacers 9a, 9b, all made of a non-magnetic substance, are attached to the recording-reproducing core 1 and the erasing cores 5a, 5b to support them and all of which are clamped by sliders 10, 11 in which disc-sliding surfaces 12a, 12b are formed so as to contain the recording-reproducing gap 2 and the erasing gaps 6a, 6b in the same level.

FIGS. 2 and 3 are diagrams showing data-recording conditions to illustrate a problem taking place in the conventional magnetic head assembly. The erasing gaps 6a, 6b function to erase noise components at both sides of a recording track when data are recorded by the recording-reproducing gap 2. As shown in FIG. 2, the radius R of the recording track becomes small as the radium of a disc is reduced. A distance L between the recording-reproducing gap 2 and the erasing gaps 6a, 6b suffers restriction in manufacturing the magnetic head assembly and can not sufficiently be small. As a result, the locus of a track width recorded by the recording-reproducing gap 2 is deviated from the erasing gap 6b moving along the inner periphery of the track. In this case, when data 14 are newly recorded on data 13 which have been previously recorded with some amount of shift on the track as shown in FIG. 3, there take place an unerased portion $\Delta T_1$ which is remained without erasure of the previously recorded data 13 and an erased portion $\Delta T_2$ in the data 14 to be rewritten. It has been well-known that the unerased portion $\Delta T_1$ of the previously recorded data constitutes a noise component to the data 14 to be rewritten which causes error at the time of reproduction.

FIG. 4 is a diagram showing an example of elimination of the unerased portion and erased portion by the conventional device. In the conventional device, the magnetic head assembly is inclined by $\theta$ with respect to a line passing through the revolutional center O of a disc and the recording-reproducing gap 2 is present on a line passing through the revolutional center O to reduce the unerased and erased portions. However, although the conventional method reduces the unerased and erased portions to a negligible level, accuracy in an angle $\theta$ of inclination is required and it is restrictive to manufacture of the magnetic head assembly.

It is an object of the present invention to solve the problem as above-mentioned in a reasonable and simple manner and to provide a magnetic head assembly comprising a recording-reproducing head with erasing heads at its both sides wherein magnetic field strength at erasing gaps near data produced by a recording-reproducing head is changed to control an area to be erased in a magnetic disc.

A more complete appreciation of the invention and many of the attendant advantages thereof will be readily obtained as the same becomes better understood by reference to the following detailed description when considered in connection with the accompanying drawings, wherein.

Preferred embodiments of the present invention will be described with reference to drawing.

Figure 1:
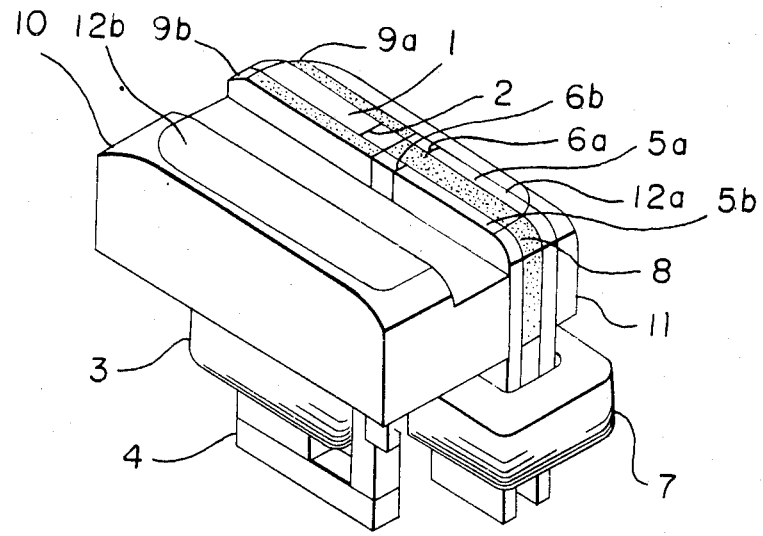
FIG. 1 is a perspective view of a conventional magnetic head assembly used for a flexible disc device.
Figure 2:
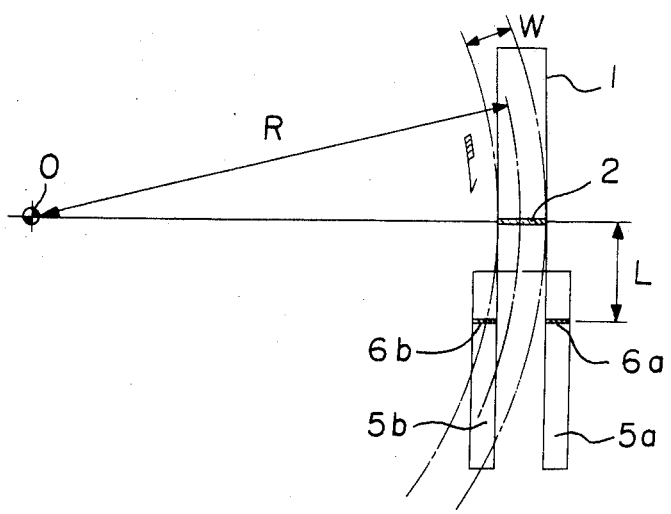
FIGS. 2 and 3 are respectively diagrams showing a problem in the conventional device.
Figure 3:
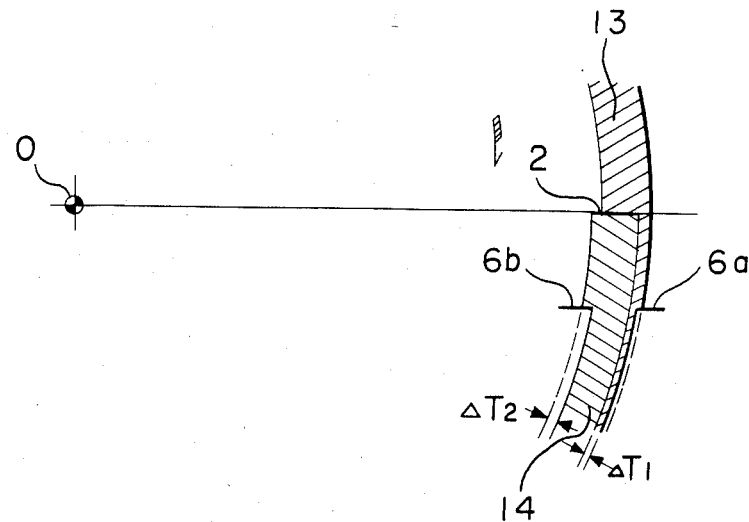
Figure 4:
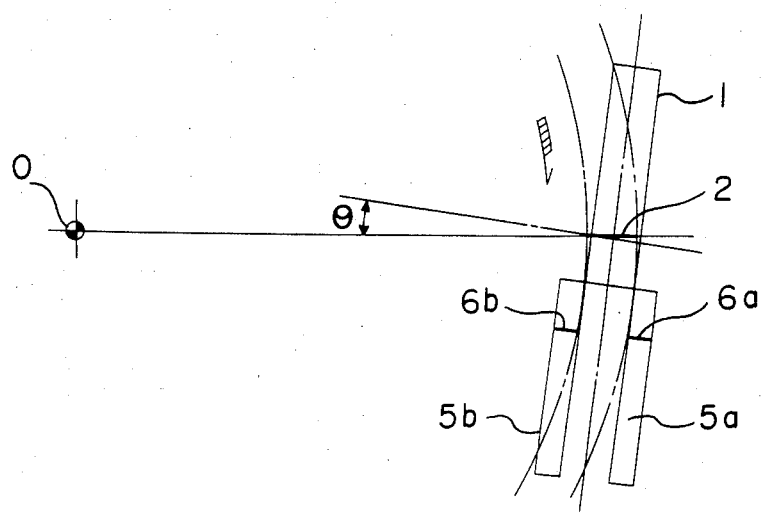
FIG. 4 is a diagram showing an attempt to eliminate the problem in the conventional device.
Figure 5:
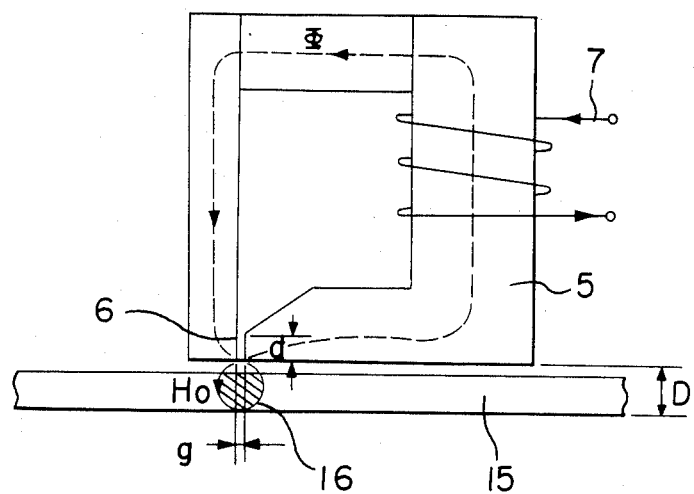
FIG. 5 is a diagram showing a side surface of the erasing head core.
Figure 6:
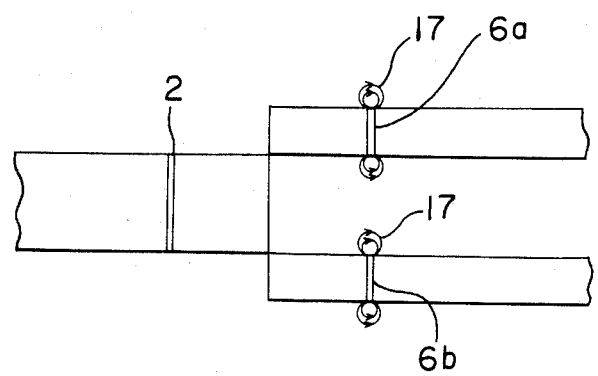
FIG. 6 is a diagram showing the erasing head core from the top.

FIGS. 5 and 6 are respectively front view and plane view diagramatically showing an erasing head core of an embodiment of the magnetic head assembly of the present invention. In FIG. 5, a magnetic flux $\phi$ produced by the erasing coil 7 circles in the erasing core 5 and passes the erasing gap 6. The erasing gap 6 is determined to have a gap length g and a gap depth d so that there produces an erasing region 16 having erasing magnetic field strength $H_0$ which effects erasure for a magnetic disc layer 15 which is apart from the erasing gap for a distance D. The erasing magnetic field extends not only in the direction of the thickness of the magnetic disc layer 15 but also in the side surface direction out of side surfaces of the erasing cores as end magnetic fluxes 17 as shown in FIG. 6.

Figure 7:
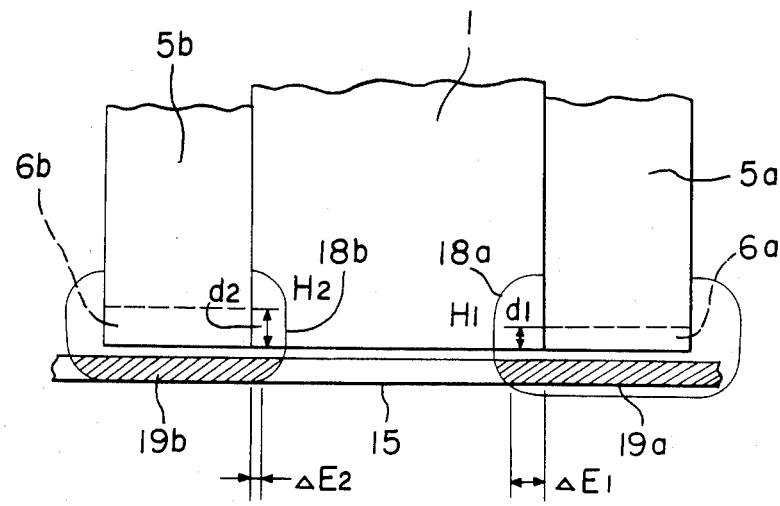
FIG. 7 is a diagram showing a side surface, partly omitted of an embodiment of the magnetic head assembly of the present invention.
Figure 8:
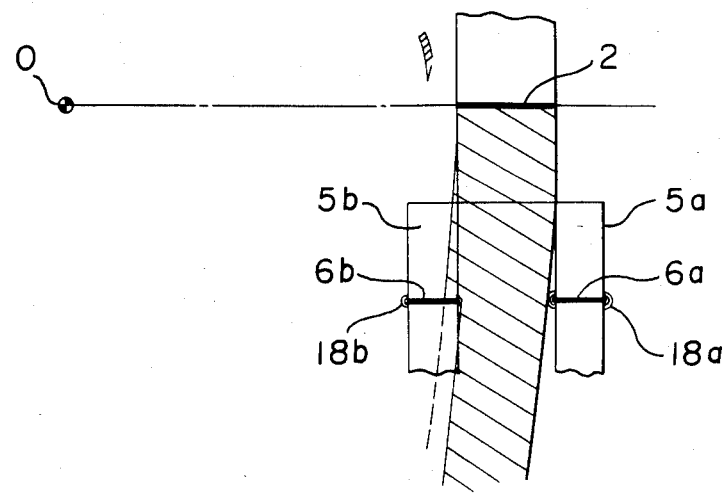
FIG. 8 is a diagram showing operations of the magnetic head assembly of the present invention.

FIG. 7 is an enlarged side view of an embodiment of the erasing core of the present invention and FIG. 8 is a diagram showing operation of the embodiment wherein the reference numerals 6a, 6b respectively designate erasing gaps of the erasing core 5a placed at the outer side of the recording-reproducing core 1 and the erasing core 5b placed at the inner side thereof. In this embodiment, the gap depth $d_1$ of the erasing gap 6a is reduced to increase magnetic flux density. This results in increasing erasing magnetic field strength $H_1$ to extend a disc erasing magnetic field 18a whereby an erasing region 19a of the magnetic disc layer 15 is widened. As a result, a magnetic flux leaked from the inner side of the erasing core 5a corrects an unerased portion by $\Delta E_1$. On the other hand, the gap depth $d_2$ of the erasing gap 6b placed at the inner side of the recording-reproducing core 1 is made greater than the depth $d_1$ to decrease the erasing region 19b to thereby prevent over-erasing. An unerased portion is corrected as shown in FIG. 8 without adjusting an angle of inclination for the magnetic head assembly. Thus, reliability of the magnetic head is improved.

Figure 9:
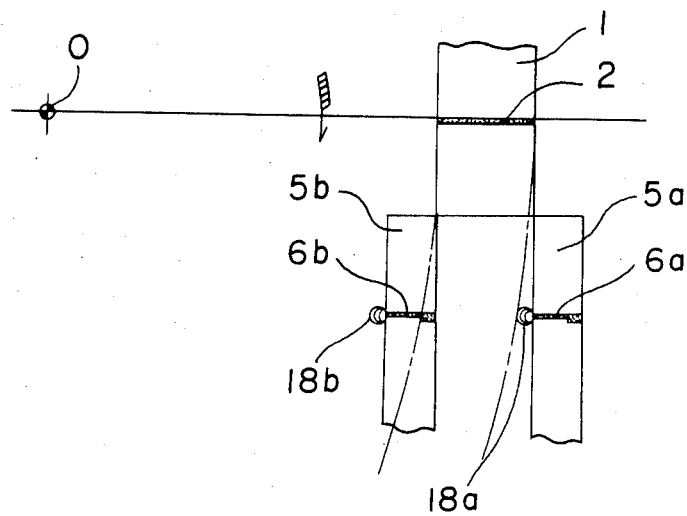
FIGS. 9 and 10 are respectively diagrams showing separate embodiments of the present invention.

FIG. 9 is a diagram showing another embodiment of the present invention wherein the gap length of the erasing gap 6a or 6b is changed within the width of the erasing core 5a or 5b. More specifically, the gap length at the inner side with respect to the disc of the erasing gap 6a is smaller than the gap length at the outer side thereof whereby the magnetic flux is much leaked at the inner side of the gap 6a to thereby produce the erasing magnetic field 18a to eliminate an unerased portion. Conversely, the gap length at the outer side of the erasing gaps 6a, 6b with respect to the disc is made larger to minimize production of a magnetic flux leaked at the side of the recording-reproducing core to thereby prevent excessively erasing of the data.

Figure 10:
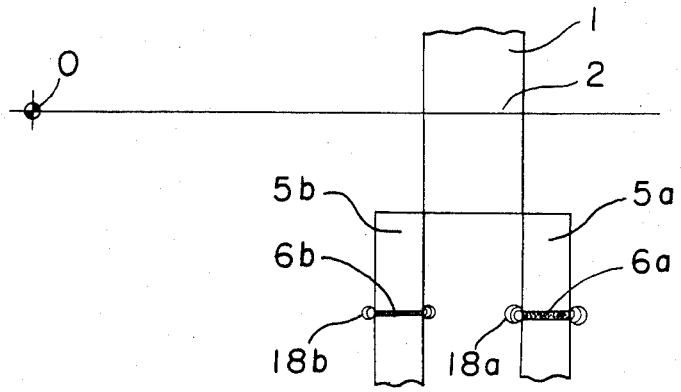

FIG. 10 is a diagram showing still another embodiment of the present invention. The embodiment provides the same effect as that of FIG. 8 by making the gap length of the erasing gap 6a greater than the gap length of the erasing gap 6b.

It is needless to say that magnetic flux density produced at the sides of the erasing gaps is controlled by using a pair of erasing heads made of materials having different magnetic properties.

Figure 11:
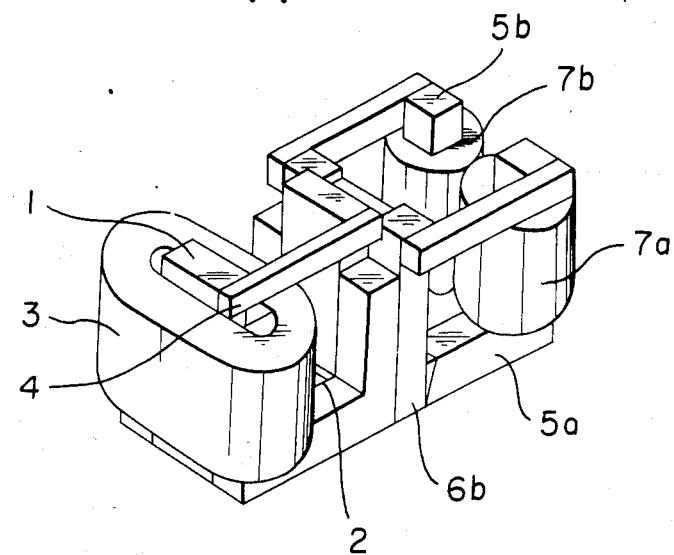
FIG. 11 is a perspective view of another embodiment of the present invention.
Figure 12:
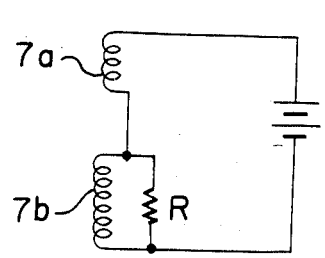
FIG. 12a and FIG. 12b are respectively circuit diagrams of other embodiments of the present invention.
Figure 12:
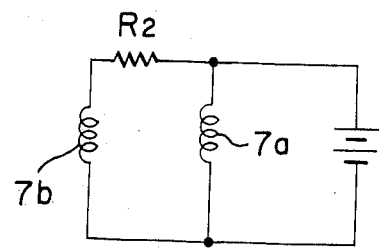

In the embodiment as above-mentioned, descriptions have been made as to change of the magnetic field strength of the erasing gaps by changing dimension of the gaps of the erasing heads or magnetic substance of the magnetic head core. It may, however, be possible to change the magnetic field strength by changing the ampere turns of the erasing heads as shown in FIGS. 11 or 12. Namely, FIG. 11 shows an embodiments in which the erasing head cores 5a, 5b respectively have the erasing coils 7a, 7b having different number of turns and FIG. 12a and FIG. 12b show embodiments in which current fed to the erasing coil 7a is different from the current fed to the erasing coil 7b.

Thus, the magnetic head assembly according to the present invention does not require provision of an accurate angle of inclination of the magnetic head assembly itself or provision of an angle of inclination of the recording-reproducing gap and the erasing gaps at the time of assembling the recording-reproducing core and the erasing cores. The problem of production of an excessively erased portion and an unerased portion is eliminated while providing an excellent productivity.

Obviously, numerous modifications and variations of the present invention are possible in light of the above teachings. It is therefore to be understood that within the scope of the appended claims, the invention may be practiced otherwise than as specifically described herein.

We claim:

1. A magnetic head assembly for use with a magnetic disk having curved data tracks, comprising a recording-reproducing head, having a recording-reproducing gap arranged along a radius of said disk and selectively aligned with one of said data tracks and having two sides perpendicular to said radius, and two erasing heads arranged along said two sides of said recording-reproducing head on opposite sides of said one of said data tracks, each erasing head having an erasing gap, said erasing gaps having a width parallel to the radius of said record at said recording-reproducing gap, a length extending across said erasing gap perpendicular to said width, and a depth perpendicular to said disk, each erasing gap producing a magnetic field to erase part of said data track, the improvement comprising:
means for making the magnetic field strength of the erasing gap of one of said erasing heads different from the magnetic field strength of the erasing gap of the other of said erasing heads, so that a wider erase path is provided on the radially outward side of the data track, to compensate for the larger off-set distance from the erase head to the data track on the radially outward side due to the curvature of said data path, thus causing a complete erasure on each side.

2. The magnetic head assembly according to claim 1, wherein the means for making the magnetic field strengths different comprises the depth of one of said erasing gaps being different from the depth of the other of said erasing gaps.

3. The magnetic head assembly according to claim 1, wherein the means for making the magnetic field strengths different comprises the length of one of said erasing gaps being different from the length of the other of said erasing gaps.

4. The magnetic head assembly according to claim 1, wherein the means for making the magnetic field strengths different comprises the magnetic material used in one of said erasing gaps being different from the magnetic material used in the other of said erasing gaps.

5. The magnetic head assembly according to claim 1, wherein the means for making the field strengths different comprises the number of turns of the erasing coil for the erasing core of one of said erasing gaps being different from the number of turns of the erasing coils for the erasing core of the other of said erasing gaps.

6. The magnetic head assembly according to claim 1, wherein the means for making the magnetic field strengths different comprises the intensity of current fed to the erasing coil for the erasing core being different from the intensity of current of the erasing coil for the erasing core in the other of said erasing gaps.

* * * * *